United States Patent [19]

Yanai et al.

[11] Patent Number: 4,477,489
[45] Date of Patent: Oct. 16, 1984

[54] METHOD OF MAKING MAGNETIC RECORDING MEDIUM

[75] Inventors: Akio Yanai; Ryuji Shirahata; Tatsuji Kitamoto, all of Odawara, Japan

[73] Assignee: Fuji Photo Film Co., Ltd., Minami-ashigara, Japan

[21] Appl. No.: 413,890

[22] Filed: Sep. 1, 1982

[30] Foreign Application Priority Data

Sep. 3, 1981 [JP] Japan ................................ 56-139095
Sep. 4, 1981 [JP] Japan ................................ 56-139324

[51] Int. Cl.$^3$ ............................................. H01F 10/02
[52] U.S. Cl. ..................................... 427/132; 427/128; 427/251
[58] Field of Search ............................... 427/127–132, 427/48, 251; 428/900

[56] References Cited

U.S. PATENT DOCUMENTS 4,220,117  9/1980  Shinohara .

Primary Examiner—Bernard D. Pianalto
Attorney, Agent, or Firm—Fleit, Jacobson, Cohn & Price

[57] ABSTRACT

In a method of making a magnetic recording medium by causing a flow of vapor obtained by evaporating a magnetic metal deposition material to impinge and deposit on a moving substrate at an oblique angle with respect to the moving substrate, the substrate is moved so that the incident angle of the vapor flow with respect to the substrate continuously changes from the maximum incident angle to the minimum incident angle, and an oxidizing gas is introduced in the vicinity of the substrate and near the maximum incident angle portion or the minimum incident angle portion of the vapor flow during the formation of a thin ferromagnetic film on the substrate. The maximum incident angle is preferably between 60° and 90°, and the minimum incident angle between 30° and 75°.

3 Claims, 5 Drawing Figures

METHOD OF MAKING MAGNETIC RECORDING MEDIUM

BACKGROUND OF THE INVENTION

1. Field of the Invention

This invention relates to a method of making a magnetic recording medium by forming a thin magnetic film on a moving flexible substrate made of a high-molecular material or the like by vacuum deposition.

2. Description of the Prior Art

Coating type magnetic recording media are widely used. These magnetic recording media use powdered magnetic materials such as magnetic oxide particles and ferromagnetic particles, for example, $\gamma\text{-}Fe_2O_3$, Co-doped $\gamma\text{-}Fe_2O_3$, $Fe_3O_4$, Co-doped $Fe_3O_4$, Berthollide compounds of $\gamma\text{-}Fe_2O_3$ and $Fe_3O_4$, $CrO_2$ or the like. These powdered magnetic materials are dispersed in organic binders such as vinyl chloride-vinyl acetate copolymers, styrene-butadiene copolymers, epoxy resins and polyurethane resins. The dispersions thus obtained are then applied in coats on non-magnetic substrates and dried to form the magnetic recording media. Recently, so-called non-binder type magnetic recording media using no binders have attracted attention because of their ability to meet strong demand for high density recording. The magnetic recording media of this type have magnetic recording layers which consist of thin ferromagnetic metal films formed by a vapor deposition process such as vacuum deposition, sputtering or ion plating, or a plating process such as electroplating or electroless plating. Thus various efforts are being made to develop non-binder type magnetic recording media suitable for practical use.

In the conventional coating type magnetic recording media, metal oxides exhibiting saturation magnetization lower than that of ferromagnetic metals are mainly used as the magnetic material. If the thickness of the magnetic material layer on the substrate is reduced, the signal output level also drops because of low saturation magnetization. Therefore, it is impossible to reduce the thickness of the magnetic material layer to such an extent as required for the high density recording. In addition, the coating type magnetic recording media are also disadvantageous in that they require complicated production processes and bulky equipment for the recovery of solvents or for pollution control. On the other hand, the non-binder type magnetic recording media can be provided with extremely thin magnetic films suitable for high density recording. In this type of magnetic recording media, ferromagnetic metals exhibiting higher saturation magnetization than metal oxide magnetic materials can be formed as extremely thin films on substrates because non-magnetic materials such as binders are not used and, in addition, the process for preparing the recording media is simple.

It is theoretically and experimentally suggested that, in order to achieve high density recording, the magnetic recording media should exhibit a high coercive force and a smaller thickness. In view of this, much hope is placed on the non-binder type magnetic recording media which can be formed to a far smaller thickness and exhibit a higher saturation magnetic flux density than the coating type magnetic recording media.

Particularly, the vacuum deposition process is very advantageous because, unlike the plating process, it requires no waste water treatment, the production process is simple and the film deposition rate is high. To make a magnetic film exhibiting a coercive force and a squareness suitable for magnetic recording media by the vacuum deposition process, it has been proposed in U.S. Pat. Nos. 3342632 and 3342633 to deposit a vapor flow on a substrate at an oblique angle with respect to the substrate surface. With this method, the larger the incident angle of the vapor flow impinging upon the substrate surface, the higher is the coercive force of the obtained medium. However, increasing the incident angle of the vapor flow results in a lower deposition efficiency and presents a problem with regard to production efficiency.

To form a thin magnetic film exhibiting a high coercive force by depositing it at a relatively small incident angle with respect to the substrate surface, it has been proposed to introduce oxygen into the vacuum tank during the oblique incidence deposition. However, this conventional method yields magnetic recording media exhibiting insufficient reproduction output, high noise and low adhesion between the magnetic film and the substrate.

SUMMARY OF THE INVENTION

The primary object of the present invention is to provide an improved method of making a magnetic recording medium by forming a thin magnetic film on a substrate by vacuum deposition.

Another object of the present invention is to provide a method capable of making a magnetic recording medium which exhibits good reproduction output characteristics and good adhesion between the magnetic film and the substrate, at a high reproducibility by oblique incidence deposition.

The specific object of the present invention is to provide a method capable of making a magnetic recording medium which exhibits good magnetic characteristics and low noise, at a high reproducibility by oblique incidence deposition.

The present invention provides a method of making a magnetic recording medium by causing a flow of vapor obtained by evaporating a magnetic metal deposition material to impinge and deposit on a moving substrate at an oblique angle with respect to the surface of the moving substrate, wherein the improvement comprises moving said substrate so that the incident angle ($\theta$) of said vapor flow with respect to said substrate continuously changes from the maximum incident angle ($\theta$max) to the minimum incident angle ($\theta$min), and introducing an oxidizing gas in the vicinity of said substrate and, in addition, near said vapor flow during the formation of a thin ferromagnetic film on said substrate. In the present invention, the oxidizing gas is introduced in the vicinity of the substrate and, in addition, near the maximum incident angle portion ($\theta$max) or the minimum incident angle portion ($\theta$min) of the flow of vapor of the magnetic metal deposition material.

DESCRIPTION OF THE PREFERRED EMBODIMENTS

The present invention will hereinbelow be described in further detail with reference to the accompanying drawings.

Figure 1A:
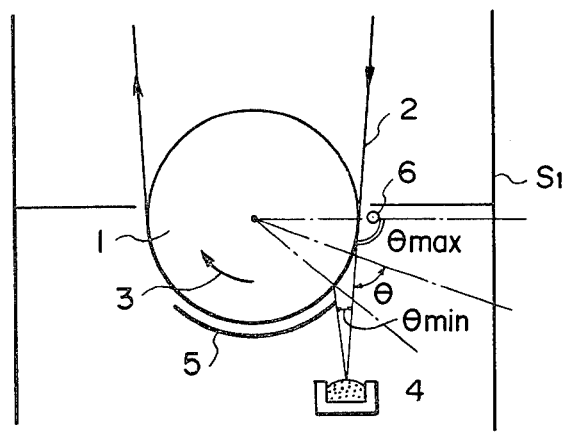
FIGS. 1A and 1B are schematic and perspective views, respectively, showing an apparatus for carrying out one embodiment of the method in accordance with the present invention.
Figure 1B:
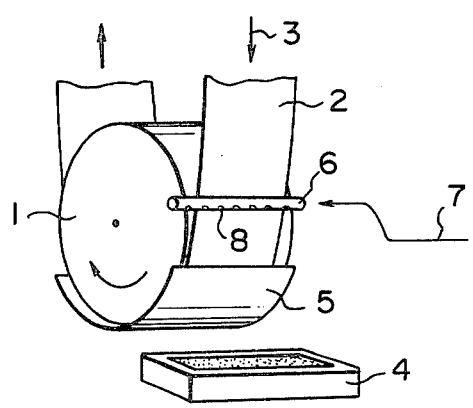

FIGS. 1A and 1B schematically show an embodiment of the method of making a magnetic recording medium in accordance with the present invention. In FIGS. 1A and 1B, a tape-like substrate 2 is moved in the direction of an arrow 3 along a cylindrical cooling can 1 positioned in a vacuum vessel S1, which is only partially shown. Below the cylindrical cooling can 1 is positioned a hearth 4 containing a magnetic deposition material. The magnetic deposition material is evaporated from the hearth 4, and the flow of vapor of the deposition material is caused to impinge and deposit on the substrate 2, which is moved along the cooling can 1, at an oblique angle with respect to the substrate 2 via a mask 5. When the tape-like substrate 2 is moved, the maximum incident angle ($\theta$max) portion of the vapor flow first impinges and deposits on a section of the tape-like substrate 2 at an oblique angle. As the substrate 2 moves, the incident angle ($\theta$) of the vapor flow with respect to said section of the tape-like substrate 2 grows continuously smaller until the minimum incident angle ($\theta$min) defined by the mask 5 is reached and deposition of the thin magnetic film on that section of the substrate 2 is interrupted. In FIGS. 1A and 1B, an oxidizing gas introducing pipe 6 is positioned in the vicinity of the maximum incident angle ($\theta$max) portion of the vapor flow and, in addition, near the substrate 2 and extending along the surface of said substrate in the direction perpendicular to the moving direction thereof. The oxidizing gas introducing pipe 6 is connected with a gas introducing line 7 to introduce an oxidizing gas from the exterior of the vacuum vessel during the deposition of a thin magnetic film. In FIGS. 1A and 1B, the oxidizing gas is fed from small holes 8 of the pipe 6 towards the flow of vapor of the magnetic deposition material. The small holes 8 should preferably be designed so that the vapor flow will not deposit in and clog the small holes 8.

Figure 2A:
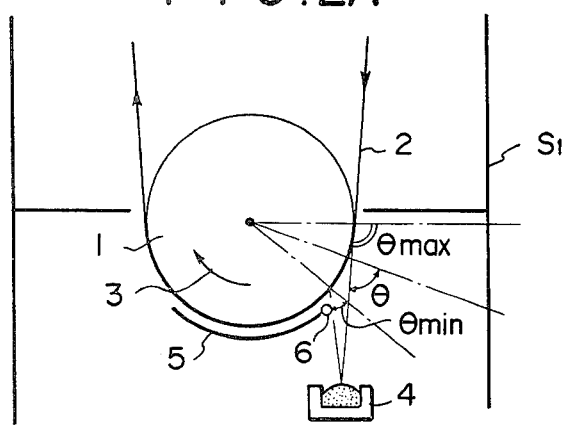
FIGS. 2A and 2B are schematic and perspective views, respectively, showing an apparatus for carrying out another embodiment of the method in accordance with the present invention.
Figure 2B:
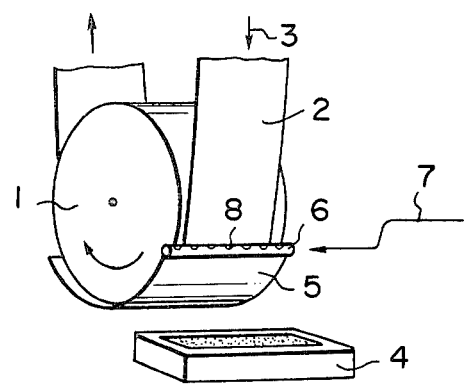

FIGS. 2A and 2B schematically show an apparatus for carrying out another embodiment of the method in accordance with the present invention. The apparatus shown in FIGS. 2A and 2B is of a construction similar to that shown in FIGS. 1A and 1B, except that the oxidizing gas introducing pipe 6 is positioned in the vicinity of the minimum incident angle ($\theta$min) portion of the vapor flow and, in addition, near the substrate 2. In FIGS. 2A and 2B, the gas introducing pipe 6 is mounted at the end of the mask 5, and the oxidizing gas is supplied from the small holes 8 of the pipe 6 towards the flow of vapor of the magnetic deposition material.

In the present invention, the incident angle of the vapor flow with respect to the substrate is generally between 30° and 90°. The maximum incident angle ($\theta$max) is preferably between 60° and 90°, and the minimum incident angle ($\theta$min) is preferably between 30° and 75°.

The magnetic metal deposition material used in the present invention may be a metal such as Fe, Co or Ni, or a ferromagnetic alloy such as Fe-Co, Fe-Ni, Co-Ni, Fe-Co-Ni, Fe-Rh, Fe-Cu, Co-Cu, Co-Au, Co-Y, Co-La, Co-Pr, Co-Gd, Co-Sm, Co-Si, Co-Pt, Ni-Cu, Mn-Bi, Mn-Sb, Mn-Al, Fe-Cr, Co-Cr, Ni-Cr, Fe-Co-Cr, Ni-Co-Cr, Fe-Co, Ni-Cr, or Fe-Si. Preferably, the deposition material is Co or an alloy containing Co in a ratio of 70 wt. % or more. To obtain a magnetic recording medium exhibiting a sufficient output and suitable for high density recording, the thickness of the thin magnetic film on the substrate should generally be between about 0.02 $\mu$m and about 5.0 $\mu$m, preferably between 0.05 $\mu$m and 2.0 $\mu$m.

The deposition process conducted in the present invention embraces not only the ordinary vacuum deposition process as described in U.S. Pat. No. 3,342,632 but also the processes of forming a thin film on a substrate under a condition in which the mean free path of evaporated molecules is large, by ionizing or accelerating the vapor flow by use of an electric field, a magnetic field or an electron beam, e.g. the electric field deposition process as described in Applicant's Japanese Unexamined patent publication No. 51(1976)-149008, or the ionizing deposition process as disclosed in Japanese patent publication Nos. 43(1968)-11525, 46(1971)-20484, 47(1972)-26579, and 49(1974)-45439, or Japanese Unexamined patent publication Nos. 49(1974)-33890, 49(1974)-34483 and 49(1974)-54235.

The tape-like substrate used in the present invention may be a plastic base such as polyethylene terephthalate, polyimide, polyamide, polyvinyl chloride, cellulose triacetate, polycarbonate or polyethylene naphthalate, or a metal strip such as Al, Al alloy, Ti, Ti alloy or stainless steel.

The oxidizing gas may be oxygen alone or oxygen in combination with another gas. The feed rate of the oxidizing gas differs according to the volume of the vacuum vessel, evacuation rate, layout in the vacuum vessel, evaporation rate of the magnetic deposition material, movement speed of the tape-like substrate, width of the substrate, kind of the magnetic deposition material and the like. Generally, it is preferable to introduce the oxidizing gas at such a rate that oxygen is contained in the formed thin magnetic film in a ratio between 5 and 33 atm %.

The present invention is further illustrated by the following nonlimitative examples.

EXAMPLE 1

Magnetic tapes were prepared by obliquely depositing cobalt on a 23 $\mu$m-thick polyethylene terephthalate film in a winding type deposition apparatus as shown in FIGS. 1A and 1B. Cobalt was evaporated from an electron beam heating type hearth 4 in various degrees of vacuum while oxygen gas was introduced from the gas introducing pipe 6 to a position in the vicinity of the polyethylene terephthalate film moving along the cooling can 1 and, in addition, in the vicinity of the maximum incident angle portion of the vapor flow. The deposition was conducted so as to obtain a deposited magnetic film having a thickness of 1500Å, and the incident angle of the vapor flow with respect to the substrate was set so that $\theta$max was 90° and $\theta$min was 42°.

Figure 3:
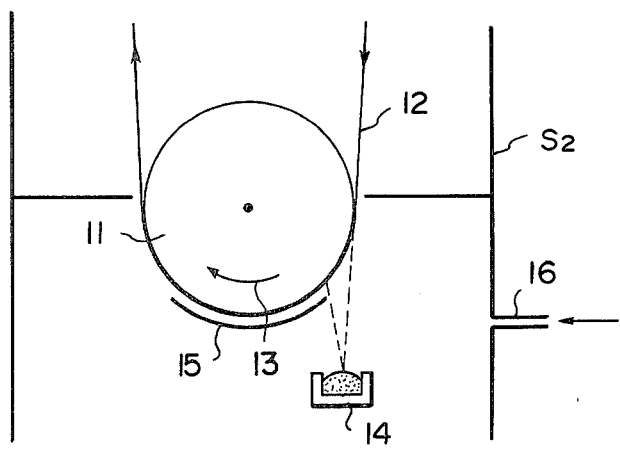
FIG. 3 is a schematic view showing an apparatus for conducting the conventional method of making a magnetic recording medium.

For comparison, magnetic tapes were prepared by using the conventional winding type deposition apparatus as shown in FIG. 3. In FIG. 3, a tape-like substrate 12 was moved in the direction of the arrow 13 along a cylindrical cooling can 11 positioned in a vacuum vessel S2 which is only partially shown. A hearth 14 was positioned below the cylindrical cooling can 11, and a flow of vapor of the deposition material contained in the hearth 14 was obliquely deposited on the substrate 12 via a mask 15. The oxidizing gas was introduced from a gas introducing port 16 at the wall of the vacuum vessel S2. Conditions other than the oxygen gas introducing method, i.e. the kind of the substrate (23 μm-thick polyethylene terephthalate film), the kind of the deposition material (cobalt material), the kind of the hearth, thickness of the deposited magnetic film and the setting of the incident angle were the same as in the above-described example conducted by using the apparatus shown in FIGS. 1A and 1B.

The electromagnetic transducing characteristics of the magnetic tapes obtained as described above by changing the pressure of oxygen gas introduced were determined by use of a VHS system video tape recorder. Adhesion between the magnetic film and the substrate, as determined by adhesive cellophane tape tests, and reproduction output when 4 MHz signals were recorded were as shown in Table 1.

TABLE 1

| Oxygen gas introducing method and pressure | | Reproduction output (dB) | Adhesion |
| --- | --- | --- | --- |
| According to the present invention | $1.0 \times 10^{-4}$ Torr | 20 | |
| | $1.5 \times 10^{-4}$ | 18 | |
| | $2.0 \times 10^{-4}$ | 17 | |
| According to the conventional method | $1.0 \times 10^{-4}$ Torr | 12 | Δ |
| | $1.5 \times 10^{-4}$ | 10 | x |
| | $2.0 \times 10^{-4}$ | 10 | x |

◯: High
Δ: Slightly low
x: Low

Table 1 clearly shows that the magnetic tapes obtained in accordance with the present invention by depositing cobalt on the substrate while the oxidizing gas is introduced in the vicinity of the substrate and, in addition, near the maximum incident angle portion of the vapor flow exhibit better adhesion between the magnetic film and the substrate and a higher reproduction output than the magnetic tapes obtained by the conventional oxidizing gas introducing method.

EXAMPLE 2

In the same way as described in Example 1, magnetic tapes were prepared by obliquely depositing a Co-Ni alloy (Ni: 25 wt. %) on a 14 μm-thick polyethylene terephthalate film in a winding type deposition apparatus as shown in FIGS. 1A and 1B while oxygen gas was introduced. The deposition was conducted to obtain a deposited magnetic film having a thickness of 2000Å, and the incident angle of the vapor flow with respect to the substrate was set so that θmax was 85° and θmin was 55°.

In the same way as the procedure for making the comparative specimens in Example 1, specimens for comparison were prepared by introducing oxygen gas according to the conventional method in a winding type deposition apparatus as shown in FIG. 3.

Adhesion and reproduction output for 5 MHz signals in the magnetic tapes obtained by changing the pressure of oxygen gas introduced were as shown in Table 2.

TABLE 2

| Oxygen gas introducing method and pressure | | Reproduction output (dB) | Adhesion |
| --- | --- | --- | --- |
| According to the present invention | $1.2 \times 10^{-4}$ Torr | 19 | |
| | $1.8 \times 10^{-4}$ | 18 | |
| | $2.5 \times 10^{-4}$ | 16 | |
| According to the conventional method | $1.2 \times 10^{-4}$ Torr | 11 | x |
| | $1.8 \times 10^{-4}$ | 11 | Δ |
| | $2.5 \times 10^{-4}$ | 10 | x |

Symbols in the adhesion column are as defined in Table 1.

Table 2 clearly shows that the magnetic tapes prepared in accordance with the present invention exhibit better adhesion and higher reproduction output than those prepared by the conventional method.

EXAMPLE 3

Magnetic tapes were prepared in accordance with the present invention in the same way as described in Example 1, except that an apparatus as shown in FIGS. 2A and 2B was used, and oxygen gas was introduced in the vicinity of the polyethylene terephthalate film and, in addition, near the minimum incident angle portion of the vapor flow.

For comparison, specimens were prepared by using the apparatus shown in FIG. 3 in the same way as the specimens prepared for comparison in Example 1.

The electromagnetic transducing characteristics of the magnetic tapes obtained as described above by changing the pressure of oxygen gas introduced were determined by use of a VHS system video tape recorder. Magnetic characteristics and modulation noise at 3 MHz when 4 MHz signals were recorded were as shown in Table 3.

TABLE 3

| Oxygen gas introducing method and pressure | | Magnetic characteristics | | Noise (dB) |
| --- | --- | --- | --- | --- |
| | | Coercive force (Oe) | Squareness ratio | |
| According to the present invention | $1.0 \times 10^{-4}$ Torr | 800 | 0.75 | 2 |
| | $1.5 \times 10^{-4}$ | 825 | 0.74 | 1 |
| | $2.0 \times 10^{-4}$ | 855 | 0.70 | 2 |
| According to the conventional method | $1.0 \times 10^{-4}$ Torr | 750 | 0.73 | 5 |
| | $1.5 \times 10^{-4}$ | 780 | 0.71 | 7 |
| | $2.0 \times 10^{-4}$ | 800 | 0.68 | 6 |

Table 3 shows that the magnetic tapes obtained in accordance with the present invention by depositing cobalt on the substrate while the oxidizing gas is introduced in the vicinity of the substrate and, in addition, near the minimum incident angle portion of the vapor flow exhibit better magnetic characteristics and lower noise than the magnetic tapes obtained by the conventional oxidizing gas introducing method.

EXAMPLE 4

Magnetic tapes were prepared in accordance with the present invention in the same way as described in Example 2, except that an apparatus as shown in FIGS. 2A and 2B was used, and oxygen gas was introduced in the vicinity of the polyethylene terephthalate film and, in addition, near the minimum incident angle portion of the vapor flow.

For comparison, specimens were prepared by using the apparatus shown in FIG. 3 in the same way as the specimens prepared for comparison in Example 2.

The magnetic characteristics and the modulation noise at 4 MHz, when 5MHz signals were recorded, of the magnetic tapes obtained by changing the pressure of oxygen gas introduced were as shown in Table 4. The modulation noise shown in Table 4 was, in each case, the average of five specimens, and the noise fluctuation among five measurements is also shown in Table 4.

TABLE 4

| Oxygen gas introducing method and pressure | | Magnetic characteristics | | Noise (dB) | |
|---|---|---|---|---|---|
| | | Coercive force (Oe) | Squareness ratio | Average | Fluctuation |
| According to the present invention | $1.2 \times 10^{-4}$ Torr | 850 | 0.77 | 1 | 0.5 |
| | $1.8 \times 10^{-4}$ | 870 | 0.76 | 2 | 1.0 |
| | $2.5 \times 10^{-4}$ | 890 | 0.74 | 2 | 0.5 |
| According to the conventional method | $1.2 \times 10^{-4}$ Torr | 730 | 0.75 | 8 | 3.0 |
| | $1.8 \times 10^{-4}$ | 780 | 0.72 | 7 | 4.5 |
| | $2.5 \times 10^{-4}$ | 830 | 0.71 | 7 | 3.5 |

Table 4 shows that the magnetic tapes made by the method in accordance with the present invention exhibit better magnetic characteristics and lower noise than the magnetic tapes made by the conventional method and, in addition, can be made with good reproducibility.

In the examples described above, only one layer of the thin magnetic film was deposited on the substrate. However, in the present invention, many thin magnetic films may be stacked on the substrate, and non-magnetic layers may be interposed among the stacked thin magnetic films. The non-magnetic layers may be made of Cr, Si, Al, Mn, Bi, Ti, Sn, Pb, In, Zn, Cu or oxides, nitrides and the like of these materials. Further, a base layer may be formed between the thin magnetic film and the substrate, or a protective layer made of an organic material or an inorganic material may be formed on the thin magnetic film. When approproate, it is also possible to form a back layer on the surface of the substrate opposite to the thin magnetic film. Further, the oxidizing gas may be introduced through a slit or the like, instead of through the small holes.

We claim:

1. A method of making a magnetic recording medium by causing a flow of vapor obtained by evaporating a magnetic metal deposition material to impinge and deposition on a moving substrate at an oblique angle with respect to the moving substrate, wherein the improvement comprises moving said substrate so that the incident angle ($\theta$) vapor flow with respect to said substrate continuously changes from the maximum incident angle ($\theta$max) to the minimum incident angle ($\theta$min), and introducing an oxidizing gas in the vicinity of said substrate by use of a gas introducing means extending along the surface of said moving substrate in the direction perpendicular to the moving direction thereof and located at a position selected from near the maximum incident angle ($\theta$max) portion of said vapor flow and near the minimum incident angle ($\theta$min) portion of said vapor flow, during the formation of a thin ferromagnetic film on said substrate wherein said maximum incident angle ($\theta$max) is in the range between 60° and 90°, and said minimum incident angle ($\theta$min) is in the range between 30° and 75°.

2. A method as defined in claim 1 wherein said oxidizing gas is oxygen.

3. A method as defined in claim 1 wherein said oxidizing gas is introduced at such a rate that oxygen is contained in said thin ferromagnetic film in a ratio between 5 and 33 atm %.

* * * * *